United States Patent

[11] 3,634,598

| [72] | Inventor | Harold W. Stanfield<br>Mequon, Wis. |
|---|---|---|
| [21] | Appl. No. | 65,384 |
| [22] | Filed | Aug. 20, 1970 |
| [45] | Patented | Jan. 11, 1972 |
| [73] | Assignee | Square D Company<br>Park Ridge, Ill. |

[54] MOLDED PLASTIC ELECTRICAL ENCLOSURE WITH A GROUND STRAP
10 Claims, 4 Drawing Figs.

[52] U.S. Cl. .................................................. 174/51,
174/65 R, 200/168 G, 339/14 R
[51] Int. Cl. ........................................................ H05k 5/02
[50] Field of Search ............................................ 174/51, 53,
66, 65; 29/521, 472.9; 339/17 R, 217 R, 217 S,
221, 14 R; 200/166 CT, 166 C, 168 C

[56] References Cited
UNITED STATES PATENTS

| 3,176,869 | 4/1965 | Kinney ........................ | 174/58 X |
| 3,415,942 | 12/1968 | Knoy ........................... | 174/51 |
| 3,512,113 | 5/1970 | Kirkendall ................... | 200/168 C X |

FOREIGN PATENTS

| 574,345 | 4/1959 | Canada ....................... | 200/166 CT |

*Primary Examiner*—Darrell L. Clay
*Attorneys*—Harold J. Rathbun and William H. Schmeling ABSTRACT: A weatherproof electrical enclosure which is formed of a molded electrically insulating plastic material. The enclosure includes a grounding strap which is maintained in position in a box portion of the enclosure when electric conduit connections through a pair of conduits are made to the box and maintains the integrity of a ground circuit through the conduit connections after the enclosure is installed in an electrical installation.

PATENTED JAN 11 1972

INVENTOR.
HAROLD W. STANFIELD
BY
*William H. Schmeling*

INVENTOR.
HAROLD W. STANFIELD
BY

MOLDED PLASTIC ELECTRICAL ENCLOSURE WITH A GROUND STRAP

This invention relates to electrical enclosures and is more particularly concerned with a ground strap in an enclosure formed of molded electrically insulating material.

Enclosures of various types are furnished in electrical installations to protect personnel against accidental contact with enclosed electrical devices and the devices within the enclosures against specified external conditions. One type of enclosure frequently used is designated as a watertight, dusttight and corrosion-resistant enclosure, that is suited for indoor installations, to protect the enclosed equipment against splashing water, seepage of water, falling or hose-directed water and severe external condensation. Further, certain types of enclosures may be required to be corrosion resistant and have conduit hubs or their equivalent which will provide for a water tight connection at the conduit entrance and that the mounting means for the enclosure be external to the cavity within the enclosure that houses the equipment. Originally, enclosures which were provided to satisfy the foregoing requirements were formed of cast iron with heavy wall sections. Cast iron enclosures were used on the theory that an appreciable time lapse would occur before the corrosive atmospheres present would cause the heavy metal walls to be damaged to the extent that the enclosures were no longer useful. More recently, enclosures of stainless steel have been used. However, it has been found that the corrosive atmospheres in certain installations rapidly corroded the stainless steel and therefore considerably reduced their expected life. The enclosure incorporating the features of the present invention is formed of a molded plastic material which is resistant to the corrosive effects of substantially all industrial environments and therefore particularly suited for installations classified as NEMA 4X, which is a standard promulgated by the National Electrical Manufactures Association.

One of the problems generated by the use of a molded plastic material in enclosures for electrical equipment is that the plastic material is electrically nonconductive and therefore in itself is incapable of providing an electrical connection between the entering and exiting conduits to the enclosure which frequently provide the electrical ground circuit path for the entire electrical system. One method by which a grounded connection through a plastic enclosure may be established is to provide a separate wire within the enclosure that is connected between the entering and exiting conduits. This method has been found objectionable in that persons installing the equipment may either omit the ground wire or fail to provide suitable tight connections so that the integrity of the grounding circuit is not assured after the enclosure is placed in service.

The present invention is directed to an arrangement which will overcome the difficulties experienced in the prior art in that the enclosure includes a ground strap which is maintained within the enclosure while the enclosure and the devices which will be positioned therein is installed and an arrangement whereby a tight electrical connection is constantly provided between the entering and exiting conduit hubs after the enclosure is placed in service.

It is an object of the present invention to provide a ground strap in a molded plastic electrical enclosure which will not be dislodged from its position within the enclosure when the enclosure is being installed in an electrical installation and will maintain the integrity of the ground circuit through the electrical conduits entering and exiting from the enclosure after the enclosure is in service.

An additional object is to provide a molded plastic-type electrical enclosure with a ground strap which is maintained in its position within the enclosure while the enclosure is being mounted in an electrical installation, assures a ground connection through the enclosure after installation and a convenient means for securing an electric switch within the enclosure which also aids in maintaining the ground strap in its position within the enclosure.

Further objects and features of the invention will be readily apparent to those skilled in the art from the specification and appended drawing illustrating certain preferred embodiments in which.

Figure 1:
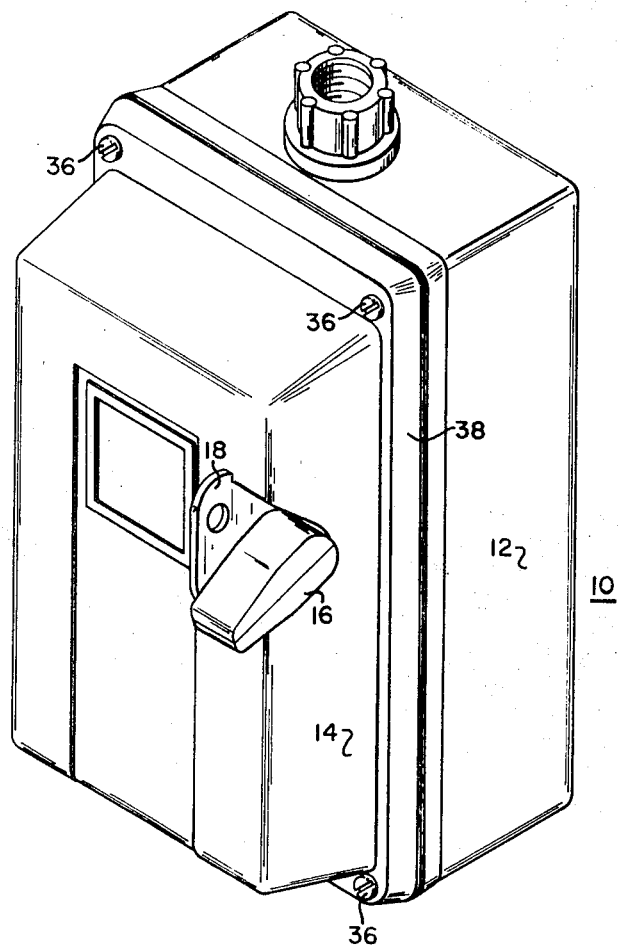
FIG. 1 is a perspective view of an enclosure incorporating the features of the present invention.

In the drawings, a numeral 10 indicates an enclosure which is provided to house electrical equipment and includes a box 12 and a cover 14. The box 12 and the cover 14 are formed of a molded plastic material, such as polyester fiberglass, to provide a structure that is particularly suited for use in corrosive atmospheres. The plastic material per se which is used to provide the enclosure 10 does not constitute one of the features of the present invention and is of the electrically insulating type and possesses the strength necessary to be used in the application involved, as is well known to those skilled in the art.

The cover 14 provides a support for a switch actuating mechanism including an actuating handle 16 and a lockout plate 18. The actuating mechanism may be constructed in a manner fully disclosed in an application for patent, Ser. No. 9,161 which was filed by the inventors Lewis M. Lehman and John R. Stauder on Feb. 6, 1970, and assigned to the assignee of the present invention. The actuating mechanism, including the handle 16, is arranged to actuate a switch 20 that is positioned adjacent a rear wall 22 of the box 12. The switch 20, which per se does not constitute one of the features of the present invention, preferably may be of the type disclosed in an application for U.S. Pat. Ser. No. 9,203 which was filed by the inventor Jordan F. Puetz on Feb. 6, 1970 and assigned to the assignee of the present invention.

The box 12 includes the rear wall 22 and four upright sidewalls 24, 26, 28 and 30 which extend from the rear wall 22 to provide the box 12 with an interior 32 which is open when the cover 14 is removed from the box 12 and closed when the cover 14 is secured to an open top defined by the front edges 34 of the sidewalls 24–30. The cover 14 is secured to the box by four screws 36, preferably formed of corrosion-resistant stainless steel, that extend through openings in a flange 38. The flange 38 extends around the periphery of the cover 14 and the openings therein are aligned with threaded inserts 40 that are located at the four front corners of the box in the material forming the sidewalls 24–30. The flange 38 of the cover 14 rests upon the front edges 34 of the box 12 and if desired, a suitable elastomeric gasket may be positioned between the front edge 34 and the flange 38 to provide a watertight and dusttight seal therebetween. For purposes of description, the sidewall 24 is designated as a top wall of the box 12. Similarly, the sidewall 26 is designated as the bottom wall, and the sidewalls 28 and 30 respectively are designated as the left and right sidewalls of the box 12. Extending forwardly from the rear wall 22 between the top wall 24 and the left sidewall 28 is a curved wall 42. Similarly, extending between the bottom wall 26 and the right sidewall 30, is a curved wall 44. The curved walls 42 and 44 extend between the near wall 22 and the front edges 34 to provide access passages to openings 46 that are located in the rear wall 22. The openings 46 receive suitable fastening screws which secure the enclosure 10 to a mounting panel, not shown. The curved walls 42 and 44 are provided to prevent passage of fluids to the interior 32 from the exterior of the enclosure 10 when the cover 14 is secured to the box 12 and the enclosure 10 is in service. Suitably located on the rear wall 22 are four spaced bosses 48 which are located to engage the sidewalls of the switch 20 to aid in positioning the switch 20 within the interior 32. Also extending forwardly from the rear wall 22 is a cylindrical boss 50 and raised mounting surfaces 52 and 54. The mounting surfaces 52 and 54 are engaged by portions of the rear surfaces of the switch 20 when the switch 20 is mounted within the enclosure 10.

Figure 3:
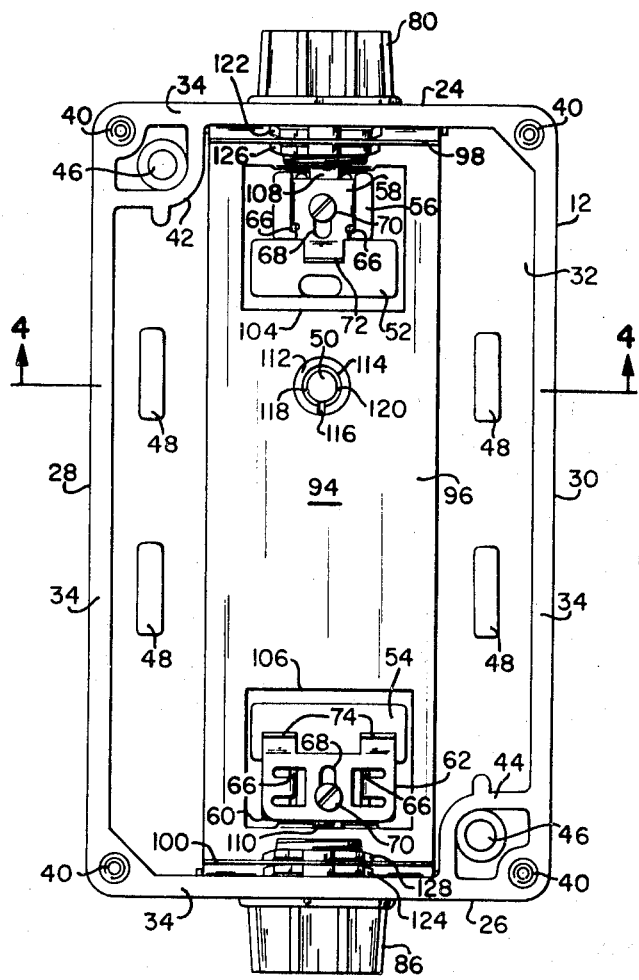
FIG. 3 is a front elevational view of the enclosure in FIG. 1 with the cover removed.
Figure 4:
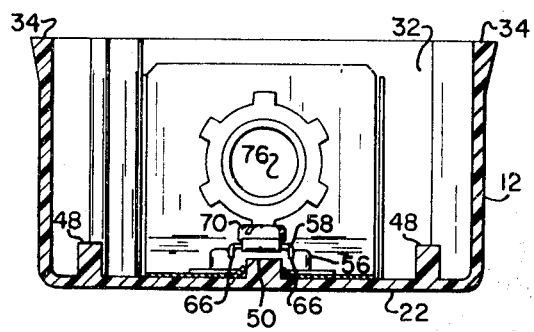
FIG. 4 is a cross-sectional view taken along line 4—4 in FIG. 3.

Located between the mounting surface 52 and the top wall 24 is a raised boss 56 which provides a support for a slide 58. Similarly located between the mounting surface 54 and a bottom wall 26 is a raised boss 60 which provides a support for a slide 62. Each of the bosses 56 and 60 has a threaded insert 64 embedded therein and a pair of parallel grooves 66 which are spaced on opposite sides of the insert 64. The grooves 66 in the boss 56 are illustrated in FIG. 4. Each of the slides 58 and 62 has an elongated slot 68 centrally located therein. The slots 68 in the respective slides 58 and 62 each receive portions of a screw 70 that is threaded into the insert 64 to immovably position the slides 58 and 62 respectively on the forward surfaces of the raised bosses 56 and 60. The slide 58 has a pair of outer edges arranged to be received within the groove 66 in the boss 56 to guide the slide 58 during its movement when the screw 70 is loosened. Similarly, the slide 62 has a pair of portions received in the grooves 66 within the boss 60 to guide the slide 62 in its movement when the screw 70 is loosened. The slide 58 has a single finger 72 projecting beyond the boss 56 in spaced relation to the mounting surface 52 when the slide is moved downwardly, as in FIG. 3. Similarly, the slide 62 has a pair of spaced fingers 74 which project upwardly beyond the boss 60 in spaced relation to the mounting surface 54 when the slide 62 is moved upwardly, as in FIG. 3. The single finger 72 and the pair of spaced fingers 74 are arranged to be received in spaces in the upper and lower walls of the switch 20 and engage ledge portions along the rear wall of the switch 20. The fingers 72 and 74 will thus maintain the switch 20 in its proper position within the interior 32 when surfaces on the rear wall of the switch 20 are positioned against the mounting surfaces 52 and 54 and the screws 70 are tightened within the inserts 64.

The top wall 24 has an opening 76 which receives a threaded portion 78 of a conduit fitting 80. Similarly, the bottom wall 26 has an opening 82 which receives a threaded portion 84 of a conduit fitting 86. The conduit fittings 80 and 86 each has an internally threaded hub portion 88 arranged to receive the thread end of a metal conduit to provide a watertight connection with the conduit. A seal 92 is positioned between the outer surfaces of the walls 24 and 26 and a flange surface 90 on each of the respective hubs 88 to prevent entrance of moisture and dust through the openings 76 and 82 into the interior 32 from the exterior of the enclosure 10.

Figure 2:
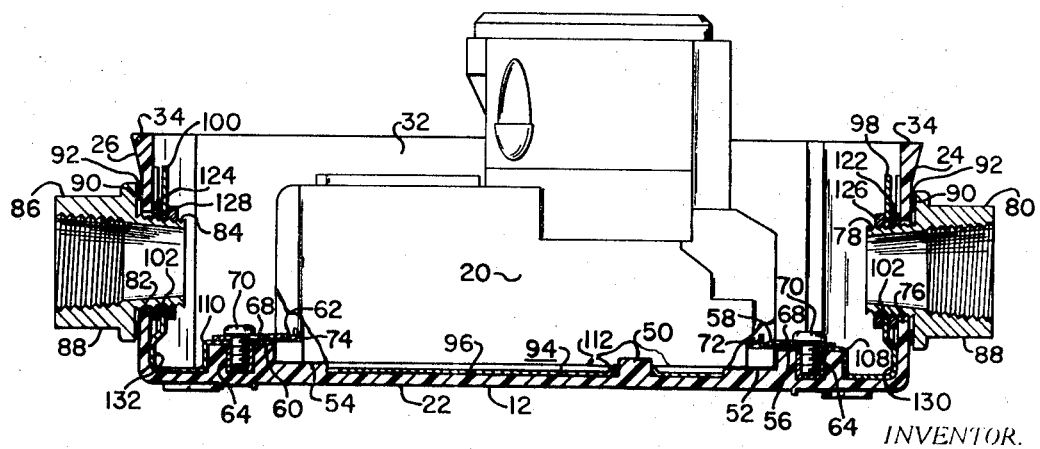
FIG. 2 is a cross-sectional view of an enclosure box incorporating a ground strap according to the present invention with a cover for the enclosure removed and a switch mounted in the enclosure shown generally in full lines with portions of the switch broken away to show the mounting slides for the switch.

The enclosure 10 includes a metal strap 94 that has a main portion 96 positioned on the rear wall 22 and a pair of arms 98 and 100 extending from the main portion 96 to be adjacent and in spaced parallel relation to the top and bottom walls 24 and 26. Each of the arms 98 and 100 has an opening 102 therein. The openings 102 in the respective arms are aligned with the openings 76 and 82 so that the threaded portions 78 and 84 extend through the openings 102 into the interior 32. The main portion 96 is provided with openings 014 and 106 adjacent its opposite ends through which the mounting surfaces 52 and 54 and the raised bosses 56 and 60 extend. Extending from the upper edge of the opening 104 and from the lower edge of the opening 106 are fingers 108 and 110 which respectively are arranged to be positioned on the upper surfaces of the raised bosses 56 and 60 and be engaged by the slides 58 and 62. The fingers 108 and 110 each have a slotted opening, not shown, which receives the screws 70 so that the slides 58 and 62 are pressed tightly against the fingers 108 and 110 when the screws 70 are tightened. The fingers 108 and 110 thus aid in maintaining the metal strap 94 in its position within the enclosure 10. The main portion 96 also includes a truncated conically shaped portion 112 that includes a central opening 114 and a slot 116. The slot 116 extends in the inclined walls forming the conically shaped portion 112 to present a pair of opposed edges 118 and 120 that are located to engage the sidewalls of the cylindrical boss 50 with a biting engagement to prevent the main portion 96 from being dislodged from its position adjacent the rear wall 22 in the event the slides 58 and 62 as well as the screws 70 are removed, as may occur when the box 12 is installed in an electrical installation. Threaded on the threaded portions 78 and 84 and positioned respectively between the sidewall 24 and the arm 98 and the sidewall 26 and the arm 100 are nuts 122 and 124. The nuts 122 and 124 when respectively tightened on the threaded portions 78 and 84 will cause the seals 92 to be compressed between the flanged surfaces 90 and the top and bottom walls 24 and 26 to assure the watertight connection between the walls 24 and 26 and the conduit fittings 80 and 86. After the nuts 122 and 124 are positioned as indicated, a pair of nuts 126 and 128 are threaded upon the threaded portions 78 and 84 to press the arms 98 and 100 against the nuts 122 and 124 so that a firm electrical connection is constantly maintained between the arms 98 and 100 and the conduit fittings 80 and 86 after the enclosure is installed in an electrical installation. As is most clearly shown in FIG. 2, the arms 98 and 100 are respectively connected to the main portion 96 by curved portions 130 and 132. The curved portions are shaped to engage the inner surfaces of the box 12 at the juncture of the rear wall 22 and the top and bottom walls 24 and 26. The curved portions 130 and 132 are provided to maintain the main portion 96 in its position against the rear wall 22, provide a space between the arms 98 and 100 wherein the nuts 122 and 124 are tightened on the threaded portions 78 and 84 and permit the arms 98 and 100 to be moved to a position which will permit the nuts 122 and 124 to be positioned so that they can be threaded on the threaded portions 78 and 84 when the conduit fittings 80 and 86 are installed in the openings 76 and 82.

From the foregoing it is apparent that the truncated conically shaped portion 112 will prevent removal of the grounding metal strap 94 from the enclosure 10 during installation, as the only manner in which it may be removed is to destroy or mutilate the cylindrical boss 50.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An enclosure for electrical equipment comprising: a box formed of electrical insulating material to have a rear wall and four upright sidewalls extending from the rear wall to provide the box with an exterior, and interior and an open top, a cover made of electrical insulating material secured to the box to close the open top and provide the box with a closed interior, a metal strap having a main portion juxtaposed to the rear wall, a pair of opposed edges on the main portion frictionally engaging opposite sides of a raised projection on the rear wall for maintaining the main portion in its juxtaposed position on the rear wall, and a pair of arms extending from the main portion to be adjacent and in spaced parallel relation to two of the sidewalls, each of said arms having an opening therein aligned with an opening in its adjacent sidewall, a pair of metal conduit fittings with each of said fittings having a threaded portion extending through the aligned openings in one of the arms and its adjacent sidewall to present a threaded end to the interior of the box and an outer portion disposed externally of the box sealingly engaging portions of the sidewall surrounding the opening through which the threaded portion extends, and pair of nuts threadedly engaging the threaded portions of the respective conduit fittings, a first one of the nuts of each pair positioned between a sidewall and an arm to engage the sidewall for maintaining the sealing engagement between the outer portion of its associated one of the pair of fittings and the external surface of the box and a second one of the nuts of each pair threadedly engaging the threaded end to engage the arm to press the arm into tight engagement with said first nut to provide a good electrical connection between the metal strap and its associated one of the pair of fittings.

2. The enclosure as recited in claim 1 wherein an electric switch is included within the closed interior and a pair of slides carried on the rear wall positions the switch within the interior and portions of the strap on the rear wall.

3. The enclosure as recited in claim 2 wherein the projection that extends from the rear wall has a cylindrical shape and the opposed edges that engage the projection are provided by a truncated conically shaped portion on the main portion of the strap.

4. The enclosure as recited in claim 2 wherein the box includes a pair of raised bosses at opposite ends of the rear wall and the slides and portions of the strap are positioned on the raised bosses.

5. The enclosure as recited in claim 4 wherein the switch is provided with terminals at its opposite ends and the slides have portions extending between barriers that separate the terminals to position the switch on the rear wall.

6. The enclosure as recited in claim 1 wherein the sidewalls and arms at opposite ends of the box have the pair of aligned openings so that the conduit fittings extend from the opposite ends of the box.

7. The enclosure as recited in claim 6 wherein the strap has a U-shape with arm portion of the U-shaped strap disposed in the parallel-spaced relation with the sidewalls at opposite ends of the box and the bight portion of the U-shaped strap is juxtaposed to the rear wall.

8. The enclosure as recited in claim 1 wherein the projection that extends from the rear wall has a cylindrical shape and the opposed edges that engage the projection are provided by a truncated conically shaped portion on the main portion of the strap.

9. The enclosure as recited in claim 1 wherein the box has a rectangular shape and partitions extending between the adjacent walls at opposite corners of the interior provide passages for screws that are provided to mount the enclosure on a support.

10. The enclosure as recited in claim 9 wherein the interior and the passages are closed by the cover when the cover is secured to the box.

* * * * *